UNITED STATES PATENT OFFICE.

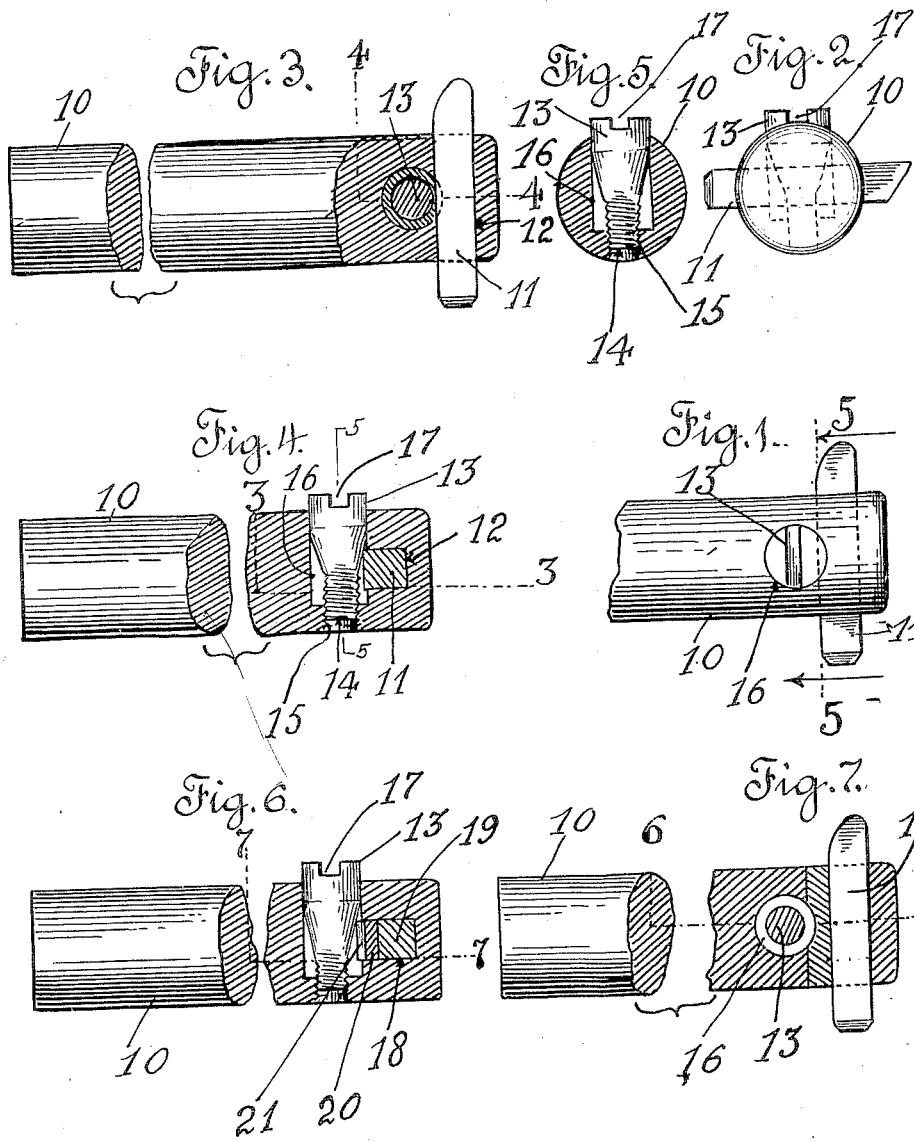

CLARENCE V. GREENAMYER, OF LOS ANGELES, CALIFORNIA.

BORING-BAR FOR LATHES.

1,319,664.  Specification of Letters Patent.  Patented Oct. 21, 1919.

Application filed January 6, 1917. Serial No. 140,868.

*To all whom it may concern:*

Be it known that I, CLARENCE V. GREENAMYER, a citizen of the United States, residing at the city of Los Angeles, county of Los Angeles, State of California, have invented new and useful Improvements in Boring-Bars for Lathes, of which the following is a specification.

Heretofore it has been the common practice to secure the cutting steel or bit in the boring bar by means of a key driven into a slot into engagement with the bit in the tool. In driving the key into the slot it sometimes happens that the bit shifts slightly which renders the work done imperfect. If the fact is discovered that the bit has shifted the key must be driven out and the bit reset and the key driven in again. It often happens after the work is completed that in driving the key out of the bar it is driven many feet from the operator. It is the object of my invention to provide a boring bar with means to secure the bit firmly in place therein without danger of shifting the bit and with which the bit can be quickly and firmly set in the bar and which enables the bit to be quickly released from the bar. A further object is to have the securing means always connected with the bar so that no time is lost in hunting up a key to secure the bit in the bar.

In the drawings forming a part of this application:

Figure 1 is a top plan of a boring bar equipped with my improvements.

Fig. 2 is an end view of the same.

Fig. 3 is a section on the line 3—3 of Fig. 4.

Fig. 4 is a section on the line 4—4 of Fig. 3.

Fig. 5 is a section on the line 5—5 of Fig. 4 with pin 13 shown in elevation and turned to bring the kerf longitudinal of the bar.

Fig. 6 is a section on the line 6—6 of Fig. 7 of a modification.

Fig. 7 is a section on the line 7—7 of Fig. 6 of a modification.

In the drawings 10 is a lathe boring bar in which is mounted the cutting bit 11, said bit being passed through the transverse hole 12. I secure bit 11 in hole 12 by means of a holding pin 13 whose lower end 14 is reduced and screw-threaded and screws into the threaded portion 15 of hole 16 in the bar, which hole extends centrally through the bar in a plane at right angles to the plane of the hole in which the bit is placed. Above the threaded portion pin 13 tapers outwardly slightly to a point about one-fourth of an inch from the top and from this point to the top the sides of the pins are parallel and engage the walls of hole 16. Hole 16 above the threaded portion is a little larger in diameter than the threaded portion and overlaps hole 12 so that when pin 13 is screwed into place without a bit contained in hole 12 a portion of the body of the pin projects into hole 12. When cutting bit 11 is in place in hole 12, as pin 13 is screwed down it engages bit 11 and holds the bit against movement in hole 12. In the top of pin 13 is a kerf 17 for the reception of a screw driver or other tool to screw the pin to its working position. In the modification shown in Figs. 6 and 7 the bit hole 18 is enough broader than the bit 19 to permit the passage through the hole of a friction block 20 which is on that side of the bit next to pin 13. When pin 13 is screwed down it crowds block 20 against bit 19 and thus provides frictional engagement for two sides of the bit in the bar. For light or medium heavy work the friction block is not needed. To hold the friction block central in the bar I prefer to provide it with a central notch 21 in which pin 13 engages to crowd it against the bit. The screw-threaded end of pin 13 is engaged in the threads of the bar sufficiently to hold the parts together before any portion of the pin will project into the bit hole so that the bit can be released without disengaging the pin from the bar.

By this construction efficient and quick acting means are provided for securing a bit in a boring tool.

Having described my invention, what I claim is:

1. A lathe boring-bar having a transverse bit hole and a transverse holding pin hole therein, the longitudinal diameters of said holes being in planes at right angles to each other, said holes for a portion thereof overlapping, said holding pin hole having one end smaller than the other and screw-threaded; and a holding pin having the lower end screw-threaded, said pin being adapted to have the threaded end screw into the threaded hole and thereby cause the body to project slightly into the bit hole.

2. A lathe boring bar having a transverse hole therethrough adapted for the reception of a bit and a friction block, said bar having a second transverse hole therethrough for the reception of a holding pin, said holes being in planes at right angles to each other and for a portion thereof overlapping, said holding pin hole having one end screw-threaded, and a holding pin having one end screw-threaded adapted to screw into the threaded hole and thereby cause the body to project slightly into the bit hole; and a friction block adapted to pass into the hole at the side of the bolt.

In witness that I claim the foregoing I have hereunto subscribed my name this 28th day of Dec., 1916.

CLARENCE V. GREENAMYER.